US006760829B2

(12) United States Patent
Lasserre et al.

(10) Patent No.: US 6,760,829 B2
(45) Date of Patent: Jul. 6, 2004

(54) MMU DESCRIPTOR HAVING BIG/LITTLE ENDIAN BIT TO CONTROL THE TRANSFER DATA BETWEEN DEVICES

(75) Inventors: Serge Lasserre, Frejus (FR); Gerard Chauvel, Antibes (FR); Dominique D'Inverno, Villeneuve-Loubet (FR)

(73) Assignee: Texas Instruments Incorporated, Dallas, TX (US)

( * ) Notice: Subject to any disclaimer, the term of this patent is extended or adjusted under 35 U.S.C. 154(b) by 392 days.

(21) Appl. No.: 09/932,807

(22) Filed: Aug. 17, 2001

(65) Prior Publication Data

US 2002/0069339 A1 Jun. 6, 2002

(30) Foreign Application Priority Data

Aug. 2, 2001 (EP) ............................................ 01402100

(51) Int. Cl.[7] .............................................. G06F 12/00
(52) U.S. Cl. ......................... 711/207; 711/201; 711/130
(58) Field of Search ................................ 711/201, 205, 711/207, 130

(56) References Cited

U.S. PATENT DOCUMENTS 5,519,842 A * 5/1996 Atallah et al. .............. 711/202
5,574,923 A * 11/1996 Heeb et al. .................... 712/38
5,848,436 A   12/1998 Sartorius et al.
5,860,107 A    1/1999 Patel
2002/0174299 A1 * 11/2002 Hayter et al. ................ 711/118

* cited by examiner

Primary Examiner—Kevin Verbrugge
(74) Attorney, Agent, or Firm—Robert D. Marshall, Jr.; W. James Brady, III; Frederick J. Telecky, Jr.

(57) ABSTRACT

A digital system is provided with a memory (506) shared by several initiator resources (540–550), wherein a portion of the initiator resources are big endian and another portion of the initiator resources are little endian. The memory is segregated into a set of regions by a memory management unit (MMU) (500–510) and an endianism attribute bit is defined for each region. For each memory request to the memory, the endianism attribute bit for the selected region is provided by the MMU. Each memory transaction request is completed in accordance with the endianism attribute of the selected region. Depending on the capability of a given initiator resource, the memory request address is adjusted to agree with the endianism attribute of the selected region, or an access fault is generated (530) if the endianism of the initiating resource does not match the endianism attribute of the selected memory region. A resource identification value (R-ID) provided by each of the initiator resources is used to identify the endianism of each of the initiator resources.

11 Claims, 7 Drawing Sheets

MMU DESCRIPTOR HAVING BIG/LITTLE ENDIAN BIT TO CONTROL THE TRANSFER DATA BETWEEN DEVICES

This application claims priority to European Application Serial No. 00402331.3, filed Aug. 21, 2000. U.S. patent application Ser. No. 09/932,651 is incorporated herein by reference.

FIELD OF THE INVENTION

This invention generally relates to microprocessors, and more specifically to improvements in cache memory and access circuits, systems, and methods of making.

BACKGROUND

Microprocessors are general-purpose processors that provide high instruction throughputs in order to execute software running thereon, and can have a wide range of processing requirements depending on the particular software applications involved. A cache architecture is often used to increase the speed of retrieving information from a main memory. A cache memory is a high-speed memory that is situated between the processing core of a processing device and the main memory. The main memory is generally much larger than the cache, but also significantly slower. Each time the processing core requests information from the main memory, the cache controller checks the cache memory to determine whether the address being accessed is currently in the cache memory. If so, the information is retrieved from the faster cache memory instead of the slower main memory to service the request. If the information is not in the cache, the main memory is accessed, and the cache memory is updated with the information.

Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in applications such as mobile telecommunications, but not exclusively, it is desirable to provide ever-increasing DSP performance while keeping power consumption as low as possible.

To further improve performance of a digital system, two or more processors can be interconnected. For example, a DSP may be interconnected with a general-purpose processor in a digital system. The DSP performs numeric intensive signal processing algorithms while the general-purpose processor manages overall control flow. The two processors communicate and transfer data for signal processing via shared memory. A direct memory access (DMA) controller is often associated with a processor in order to take over the burden of transferring blocks of data from one memory or peripheral resource to another and to thereby improve the performance of the processor.

There are two major types of data alignment, referred to as "big endian" and "little endian." Various processors use either one or the other type.

SUMMARY OF THE INVENTION

Particular and preferred aspects of the invention are set out in the accompanying independent and dependent claims. In accordance with a first aspect of the invention, a digital system is provided with a memory shared by several initiator resources, wherein a portion of the initiator resources are big endian and another portion of the initiator resources are little endian. The memory is segregated into a set of regions by a memory management unit (MMU) and an endianism attribute bit is defined for each region. For each memory request to the memory, the endianism attribute bit for the selected region is provided by the MMU. Each memory transaction request is completed in accordance with the endianism attribute of the selected region.

In one embodiment of the invention, the memory request address is adjusted to agree with the endianism attribute of the selected region.

In another embodiment, an access fault is generated if the endianism of the initiating resource does not match the endianism attribute of the selected memory region.

In some embodiments, a resource identification value provided by each of the initiator resources is used to identify the endianism of each of the initiator resources.

BRIEF DESCRIPTION OF THE DRAWINGS

Particular embodiments in accordance with the invention will now be described, by way of example only, and with reference to the accompanying drawings in which like reference signs are used to denote like parts and in which.

Corresponding numerals and symbols in the different figures and tables refer to corresponding parts unless otherwise indicated.

DETAILED DESCRIPTION OF EMBODIMENTS OF THE INVENTION

Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

Figure 1:
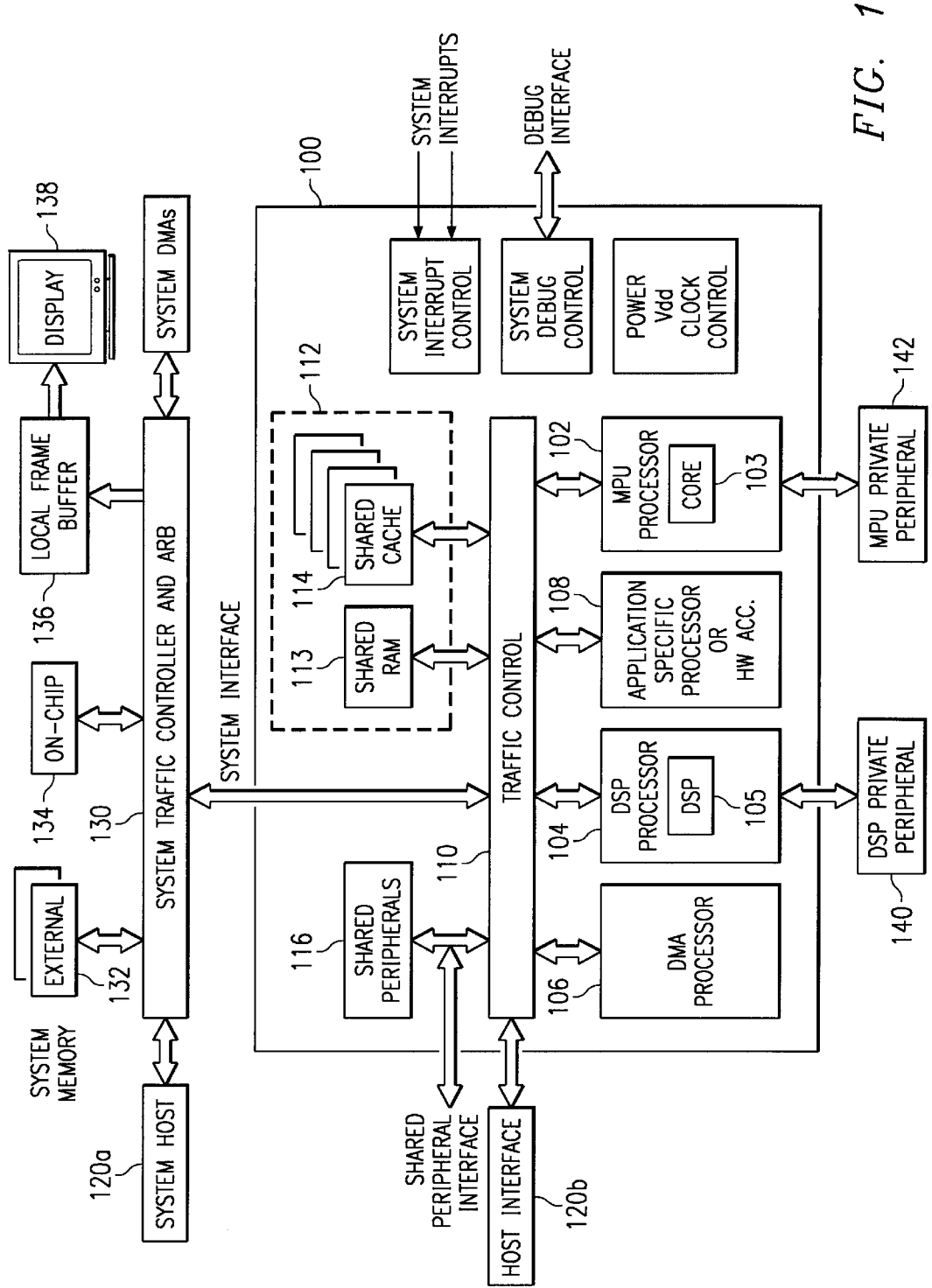
FIG. 1 is a block diagram of a digital system that includes an embodiment of the present invention in a megacell core having multiple processor cores.

FIG. 1 is a block diagram of a digital system that includes an embodiment of the present invention in a megacell core 100 having multiple processor cores. In the interest of clarity, FIG. 1 only shows those portions of megacell 100 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail. U.S. Pat. No. 5,329,471 issued to Gary Swoboda, et al, describes in detail how to test and emulate a DSP. Details of portions of megacell 100 relevant to an embodiment of the present invention are explained in sufficient detail herein below, so as to enable one of ordinary skill in the microprocessor art to make and use the invention.

Referring again to FIG. 1, megacell 100 includes a control processor (MPU) 102 with a 32-bit core 103 and a digital signal processor (DSP) 104 with a DSP core 105 that share a block of memory 113 and a cache 114, that are referred to as a level two (L2) memory subsystem 112. A traffic control block 110 receives transfer requests from a host processor connected to host interface 120b, requests from control processor 102, and transfer requests from a memory access node in DSP 104. The traffic control block interleaves these requests and presents them to the shared memory and cache. Shared peripherals 116 are also accessed via the traffic control block. A direct memory access controller 106 can transfer data between an external source such as off-chip memory 132 or on-chip memory 134 and the shared memory. Various application specific processors or hardware accelerators 108 can also be included within the megacell as required for various applications and interact with the DSP and MPU via the traffic control block.

External to the megacell, a level three (L3) control block 130 is connected to receive memory requests from internal traffic control block 110 in response to explicit requests from the DSP or MPU, or from misses in shared cache 114. Off chip external memory 132 and/or on-chip memory 134 is connected to system traffic controller 130; these are referred to as L3 memory subsystems. A frame buffer 136 and a display device 138 are connected to the system traffic controller to receive data for displaying graphical images. A host processor 120a interacts with the external resources through system traffic controller 130. A host interface connected to traffic controller 130 allows access by host 120a to external memories and other devices connected to traffic controller 130. Thus, a host processor can be connected at level three or at level two in various embodiments. A set of private peripherals 140 are connected to the DSP, while another set of private peripherals 142 are connected to the MPU.

Figure 2A:
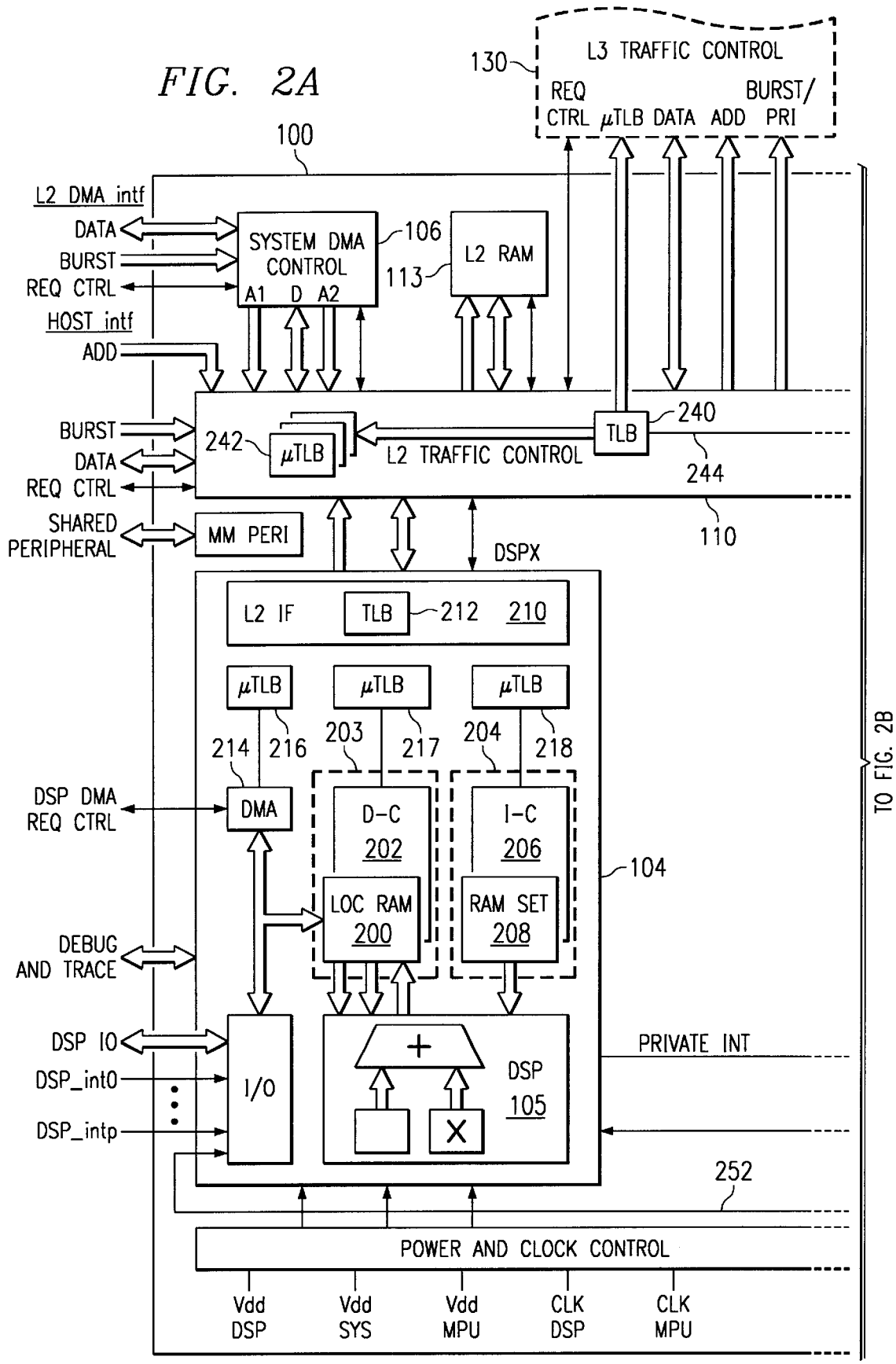
FIGS. 2A and 2B together is a more detailed block diagram of the megacell core of FIG. 1.
Figure 2B:
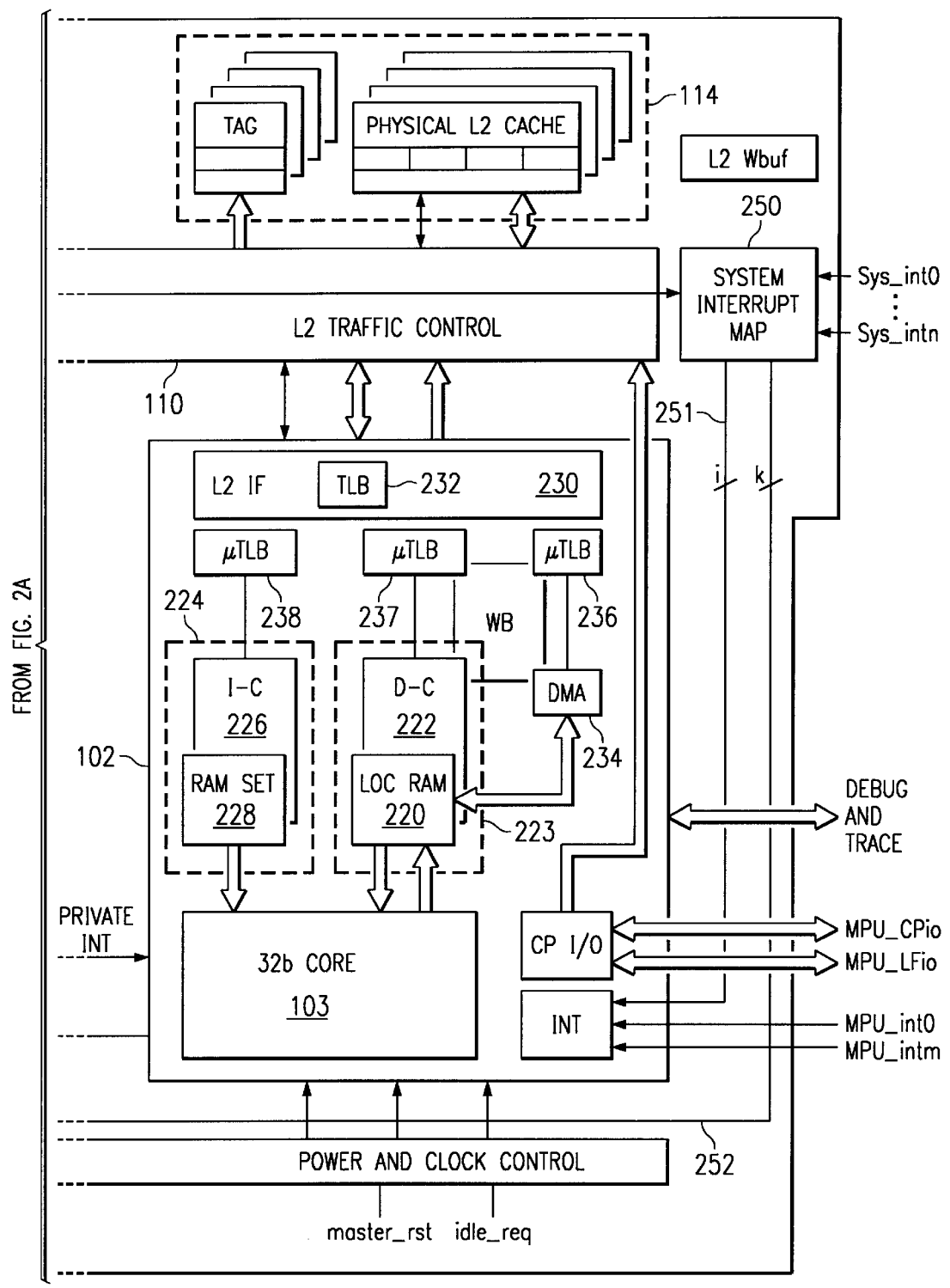

FIG. 2, comprised of FIG. 2A FIG. 2B together, is a more detailed block diagram of the megacell core of FIG. 1. DSP 104 includes a configurable cache 203 that is configured as a local memory 200 and data cache 202, and a configurable cache 204 that is configured as instruction cache 206 and a RAM-set 208, which are referred to as level one (L1) memory subsystems. The DSP is connected to the traffic controller via an L2 interface 210 that also includes a translation look-aside buffer (TLB) 212. A DMA circuit 214 is also included within the DSP. Individual micro TLBs (µTLB) 216–218 are associated with the DMA circuit, data cache and instruction cache, respectively.

Similarly, MPU 102 includes a configurable cache 223 that is configured as a local memory 220 and data cache 222, and a configurable cache 224 that is configured as instruction cache 226 and a RAM-set 228, again referred to as L1 memory subsystems. The MPU is connected to traffic controller 110 via an L2 interface 230 that also includes a TLB 232. A DMA circuit 234 is also included within the MPU. Individual micro TLBs (µTLB) 236–238 are associated with the DMA circuit, data cache and instruction cache, respectively.

L2 traffic controller 110 includes a TLB 240 and one or more micro-TLB (µTLB) 242 that are associated with system DMA block 106, host processor interface 120b for a host connected at level two, and other application specific hardware accelerator blocks. Similarly, L3 traffic controller 130 includes a µTLB controllably connected to TLB 240 that is associated with system host 120a at level three. This µTLB is likewise controlled by one of the megacell 100 processors.

Memory Management Unit

At the megacell traffic controller level, all addresses are physical. They have been translated from virtual to physical at the processor sub-system level by a memory management unit (MMU) associated with each core, such as DSP core 105 and MPU core 103. At the processor level, access permission, supplied through MMU page descriptors, is also checked, while at the megacell level protection between processors is enforced by others means, which will be described in more detail later.

The translation look-aside buffer (TLB) caches contain entries for virtual-to-physical address translation and page descriptor information such as access permission checking, cache policy for various levels, etc. If the TLB contains a translated entry for the virtual address, the access control logic determines whether the access is permitted. If access is permitted, the MMU generates the appropriate physical address corresponding to the virtual address. If access is not permitted, the MMU sends an abort signal via signal group 244 to the master CPU 102. The master CPU is identified by the value of the R-ID field. On a slave processor such as a hardware accelerator the R-ID is equal to the R-ID of the master CPU.

Upon a TLB miss, i.e., the TLB does not contain an entry corresponding to the virtual address requested, an exception is generated that initiates a translation table walk software routine. The TLB miss software handler retrieves the translation and access permission information from a translation table in physical memory. Once retrieved, the page or section descriptor is stored into the TLB at a selected victim location. Victim location selection is done by software or with hardware support.

Translation Table

To provide maximum flexibility, the MMU is implemented as a software table walk, backed up by TLB caches both at the processor sub-system and megacell level. This allows easy addition of new page size support or new page descriptor information if required. A TLB miss initiates a TLB handler routine to load the missing reference into the TLB. At the Megacell 100 level, a TLB miss asserts a miss signal in signal group 244 and is routed via system interrupt router 250 to the processor having generated the missing reference or to the processor in charge of the global memory management, via interrupt signals 251, 252.

Translation tables and TLB cache contents must be kept consistent. A flush operation is provided for this reason.

An address reference is generally located within the µTLB or main TLB of each processor sub-system; however, certain references, such as those used by system DMA 106 or host processor 120, for example, to access megacell memories can be distributed within L2 traffic controller 110 and cached into L2 system shared TLB 240 Because system performance is very sensitive to the TLB architecture and size, it is important to implement efficient TLB control commands to lock entries for critical tasks or unlock and flush those entries when a task is deleted without degrading the execution of other tasks. Therefore, each TLB and L2 cache entry holds a task-ID. Commands are supplied to flush locked or unlocked entries of a TLB/µTLB corresponding to a selected task.

As part of the page descriptor information, the MMU provides cacheability and bufferability attributes for all levels of memory. The MMU also provides a "Shared" bit for each entry to indicate that a page is shared among multiple processors (or tasks). This bit, as standalone or combined with the task-ID, allows specific cache and TLB operation on data shared between processors or/and tasks. The MMU may also provide additional information, such as address space endianism, as will be described later.

All megacell memory accesses are protected by a TLB. As they all have different requirements in term of access frequencies and memory size, a shared TLB with individual µTLB backup approach has been chosen to reduce the system cost at the megacell level. This shared TLB is programmable by each processor. The architecture provides enough flexibility to let the platform work with either independent operating systems (OS) on each processors or a distributed OS with a unified memory management, for example.

The present embodiment has a distributed operating system (OS) with several domains corresponding to each processor but only a single table manager for all processors. Slave processors do not manage the tables. In a first embodiment, slave processor R-IDs are equal to the R-ID of the master CPU. In another embodiment, they could, however, have a different R-ID to control their TLB entries lock/unlock entries corresponding to some of their own tasks or flush all their entries, when putting themselves in sleep mode to free entries for the others processors. Having different R-ID provides a means to increase security in a concurrent multi-processor environment, processor X cannot access memory allocated to processor Y.

In another embodiment with several independent OS(s), for example, there will be independent tables. These tables can be located in a memory space only viewed by the OS that they are associated with in order to provide protection from inadvertent modification by another OS. As they manage the virtual memory and task independently, the R-ID provides the necessary inter-processor security. R-Ids are managed by a single master CPU. This CPU can make TLB operations on all TLB entries. TLB operation or memory accesses from slave processor are restricted by their own R-ID. The CPU master will have rights to flush out entries belonging to another processor in a different OS domain.

The organization of the data structures supporting the memory management descriptor is flexible since each TLB miss is resolved by a software TLB-miss handler. These data structures include the virtual-to-physical address translation and all additional descriptors to manage the memory hierarchy. The list of these descriptors and their function is described in Table 2. Table 1 includes a set of memory access permission attributes, as an example. In other embodiments, a processor may have other modes that enable access to memory without permission checks.

TABLE 1

Memory Access Permission

| Supervisor | User |
|---|---|
| No access | No access |
| Read only | No access |
| Read only | Read only |
| Read/Write | No access |
| Read/Write | Read only |
| Read/Write | Read/Write |

TABLE 2

Memory Management Descriptors

| | |
|---|---|
| Execute Never | provides access permission to protect data memory area from being executed. This information can be combined with the access permission described above or kept separate. |
| Shared | indicates that this page may be shared by multiple tasks across multiple processor. |
| Cacheability | Various memory entities such as individual processor's cache and write buffer, and shared cache and write buffer are managed through the MMU descriptor. The options included in the present embodiment are as follows: Inner cacheable, Outer cacheable, Inner Write through/write back, Outer write through/write back, and Outer write allocate. The terms Inner and outer refer to levels of caches that are be built in the system. The boundary between inner and outer is defined in specific embodiment, but inner will always include L1 cache. In a system with 3 levels of caches, the inner correspond to L1 and L2 cache and the outer correspond to L3 due to existing processor systems. In the present embodiment, inner is L1 and outer is L2 cache. |
| Endianism | determines on a page basis the endianness of the transfer. |

MMU/TLB Control Operation

Figure 3:
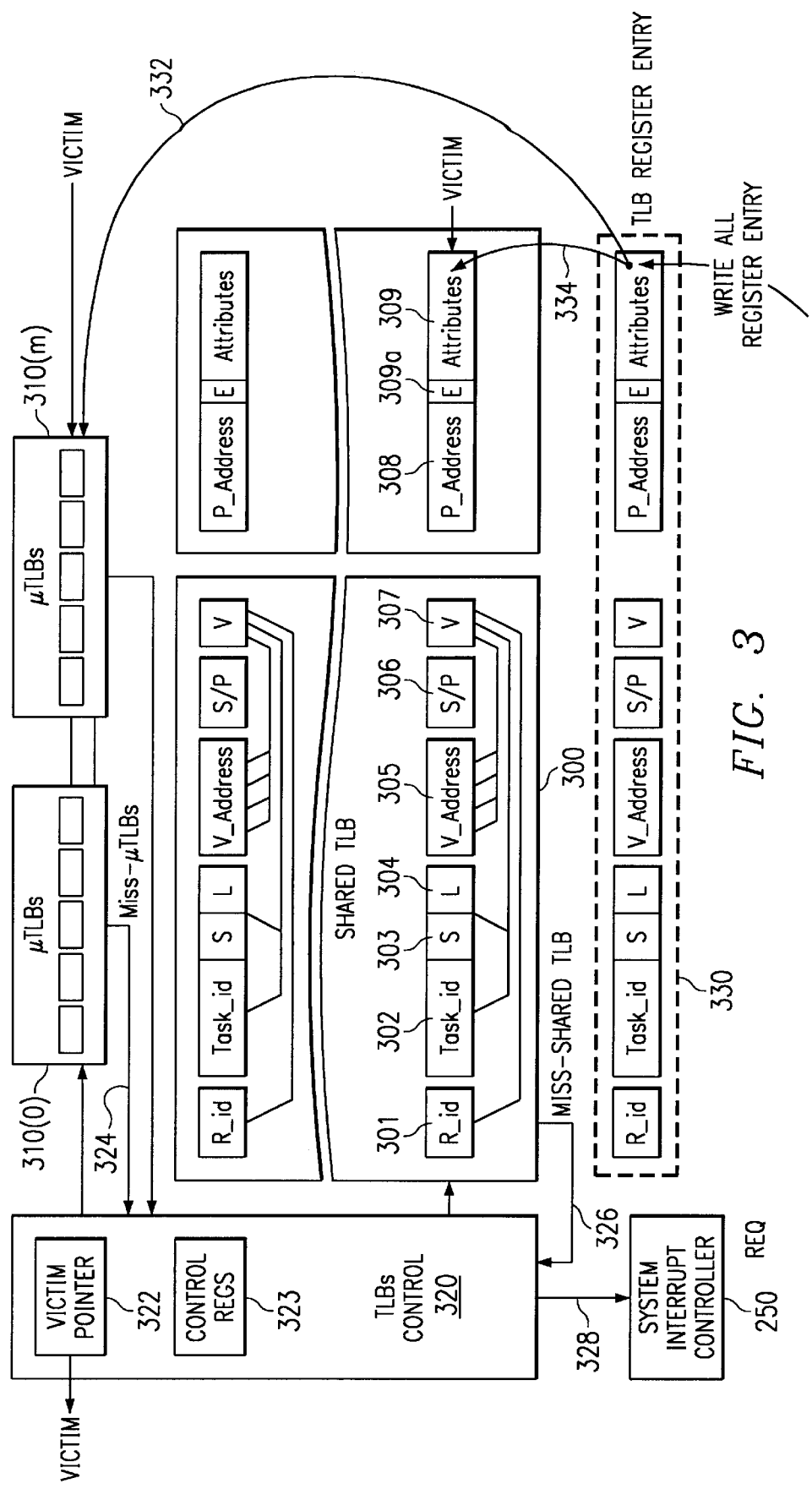
FIG. 3 is a block diagram illustrating a shared translation look-aside buffer (TLB) and several associated micro-TLBs ($\mu$TLB) included in the megacell of FIG. 1.

FIG. 3 is a block diagram illustrating a shared translation look-aside buffer (TLB) 300 and several associated micro-TLBs (µTLB) 310(0)–310(n) included in megacell 100 of FIG. 2. On a µTLB miss, the shared TLB is first searched. TLB controller 320 is alerted by asserting a µTLB miss signal 324. In case of a hit on the shared TLB, the µTLB that missed is loaded with the entry content of the shared TLB 300. In case of miss in shared TLB 300, the shared TLB alerts TLB controller 320 by asserting a TLB miss signal 326. Controller 320 then asserts an interrupt request signal 328 to system interrupt controller 250. Interrupt controller 250 asserts an interrupt to the processor whose OS supervises the resource which caused the miss. A TLB entry register 330 associated with TLB controller 320 is loaded by a software TLB handler in response to the interrupt. Once loaded, the contents of TLB entry register 330 are transferred to both shared TLB 300 and the requesting µTLB at a selected victim location as indicated by arcs 332 and 334.

A separate TLB entry register 330 is only one possible implementation and is not necessarily required. The separate register TLB entry register is a memory mapped register that allows buffering of a complete TLB entry (more than 32 bits). A TLB value is not written directly in the TLB cache but is written to the TLB entry register first. Because of the size of an entry, several writes are required to load the TLB entry register. Loading of a TLB cache entry is then done in a single operation "Write TLB entry". Advantageously, other uTLBs associated with other modules can continue to access the shared TLB while the TLB entry register is being loaded, until a second miss occurs. Advantageously, by controlling access to the TLB via the TLB entry register, CPUs have no direct access to TLB cache internal structure and thus the risk of partial modifications inconsistent with the MMU tables is avoided.

The sequence of operations to update a TLB cache entry after a miss is:

1—the software TLB handler writes to the TLB entry register,

2—the software TLB handler sends a command to write the TLB entry, which transfers a value from TLB entry register to a preselected victim TLB cache entry; and 3—control circuitry checks and pre-selects a next victim TLB entry, in preparation for the next miss. In this embodiment, this step is generally performed in background prior to the occurrence of a miss.

Advantageously, TLB cache entries can be preemptively updated under OS software control to prevent TLB miss by pre-loading a new entry, using the following sequence of operation:

1—control circuitry checks and selects a TLB entry, referred to as a victim TLB cache entry.
2—the software TLB handler writes to the TLB entry register, and
3—the software TLB handler sends a command to write the TLB entry, which transfers a value from TLB entry register to the selected victim TLB cache entry.

The priority on the shared TLB is managed in the same way as priority on a memory access. One or more resources can be using the shared TLB. One or more resources can program the shared TLB. The replacement algorithm for selecting the next victim location in the shared TLB is under hardware control. A victim pointer register 322 is maintained for each TLB and μTLB to provide a victim separate pointer for each. A typical embodiment will use a round robin scheme. Another embodiment may use a least recently used scheme or a random scheme, for example. Different TLBs within a single megacell can use different replacement schemes. However, in an embodiment in which the system has a master CPU with a distributed OS, this master CPU could also bypass the hardware replacement algorithm by selecting a victim entry, reading and then writing directly to the Shared TLB.

In this embodiment, each shared TLB has 256 entries. Each μTLB is generally much smaller, i.e., has fewer entries, than the shared TLB. In various embodiments, each shared TLB has 64–256 or more entries while μTLBs generally have 4–16 entries. The penalty for a miss in a μTLB is small since a correct entry is generally available from the shared TLB. Therefore, the present embodiment does not provide direct control of the victim pointers of the various μTLBs; however, direct control of the victim pointer of shared TLBs, such as 212, 232, and 240, is provided.

Each entry in a TLB has a resource identifier 301 along with task-ID 302. Resource-IDs and task IDs are not extension fields of the virtual address (VA) but simply address qualifiers. Resource IDs are provided by a resource-ID register associated with each requester resource. Each resource typically has its own associated R-ID register; however, various embodiments may choose to provide resource ID registers for only a selected portion of the resources. A task ID is provided by a task-ID register associated with resource. A task register associated with a non-processor resource, such as DMA, a coprocessor, etc, is loaded with a task value to indicate the task that it is supporting.

In another embodiment, only processor resources that execute program modules have an associated programmable task-ID register. In this case, a system wide default value may be provided for access requests initiated by non-processor resources such as DMA. The default value may be provided by a programmable register or hardwired bus keepers, for example.

Advantageously, with the task-ID, all entries in a TLB belonging to a specific task can be identified. They can, for instance, be invalidated altogether through a single operation without affecting the other tasks. Advantageously, the resource ID permits discrimination of different tasks being executed on different resources when they have the same task number. Task-ID number on the different processors might not be related; therefore, task related operations must be, in some cases, qualified by a resource-ID.

In another embodiment, the R-ID and Task_ID registers are not necessarily part of the resource core and can be located elsewhere in the system, such as a memory mapped register for example, and associated to a resource bus. The only constraint is that a task_ID register related to a CPU must be under the associated OS control and updated during context switch. R-ID must be set during the system initialization. In some embodiments at system initialization, all R-ID and Task-ID registers distributed across the system are set to zero, which is a default value that causes the field to be ignored. In other embodiments, a different default value may be used. In other embodiments, R-ID "registers" provide hardwired values. The default value may be provided by a programmable register or hardwired bus keepers, for example.

In yet another embodiment, the R-ID and/or task-ID registers are not implemented. In this case, the TLB does not contain R-ID and/or task-ID fields in the page entries and the attendant advantages are not realized. However, aspects of the present invention can still be implemented in such an embodiment.

Referring still to FIG. 3, each TLB entry includes a virtual address field 305 and a corresponding physical address field 308 and address attributes 309. Various address attributes are described in Table 1 and Table 2. Address attributes define conditions or states that apply to an entire section or page of the address space that is represented by a given TLB entry. An S/P field 306 specifies a page size. In the present embodiment, an encoding allows page sizes of 64 kb, 4 kb and 1 kb to be specified. Naturally, the page size determines how many most significant (ms) address bits are included in a check for an entry.

Each TLB entry also includes "shared" bit 303 and a lock bit 304. All entries marked as shared can be flushed in one cycle globally. A V field 307 indicates if an associated TLB cache entry is valid. V field 307 includes several V-bits that are respectively associated with R-ID field 301 to indicate if a valid R-ID entry is present, task-ID field 302 to indicate if a valid task-ID entry is present, and virtual address field 305 to indicate if a valid address entry is present. These valid bits enable the compare logic with their associated field.

Each TLB entry also includes an endianness attribute bit 309a that indicates the endianism of data stored within the memory address region represent by each TLB entry. A system with megacell 100 will sometimes be deployed in situations that involves mixed endianness. Some processors may be bi-endian with a specific endianness selected at reset or on a memory region basis. The "endianness" of a processor is a property that describes the orientation of external data when it arrives at the processor's external data bus. A processor is little endian if data objects with ascending addresses will appear at more significant places on the data bus. Likewise, a processor is big endian if data objects with ascending addresses will appear at less significant places on the data bus The endianness behavior of megacell 100 is defined assuming that the addressable unit of memory is an 8-bit byte, the width when referencing a processor's external memory interface is 32 bits, and any shifting required to access objects smaller than 32 bits occurs inside the processor, i.e., no shifting is required between the external memory interface and the memory.

Figure 4:
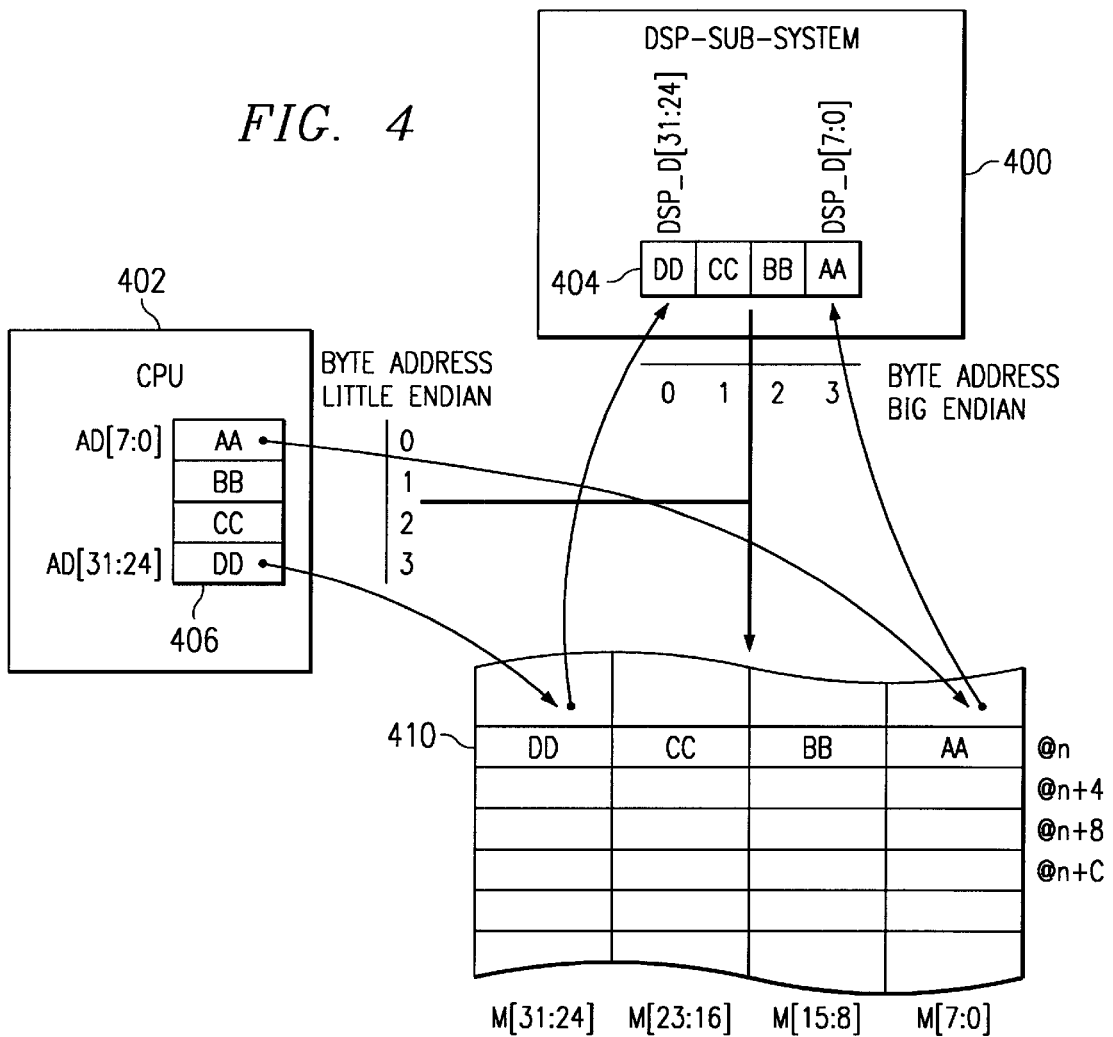
FIG. 4 is an illustration of two processors with different endianness accessing a same memory location.

FIG. 4 is an illustration of two processors with different endianness accessing a same memory location 410, in this case a DSP 400 and a CPU 402. A fundamental requirement is that external memory be connected to the processor memory interface in such a manner that accesses to 32-bit (aligned) objects yield the same results in both big and little endian modes of operation, whether within different tasks on a single processor or within different processors.

As an example, suppose that a 32-bit value 0xDDCCBBAA is stored in the 32-bit memory word 410 at address @n. Processor 400 is big endian and CPU 402 is little endian. Endian invariance means that the data lines from the memory must be connected to a data portion of the processor's memory interface in such a manner that 0xDD is wired to the most significant byte of the data bus and 0xAA is wired to the least significant byte; this connection does not depend on the endianness of the processor. In this examples, processor 400 connects the data lines such that 0xDD appears in byte lane 0 404 according to big endianness and processor 402 connects the data lines such that 0xDD appears in byte lane 3 406, according to little endianness.

Endian invariance does not extend to objects smaller than 32 bits. If the processor writes the 8-bit value 0xEE to a location with byte address 1, then the byte overwritten in memory will be the one containing 0xBB if the processor mode is little endian and 0xCC if it is big endian. Similarly, writing the 16-bit value 0xFFEE to location 2 will overwrite 0xDDCC if the processor mode is little endian and 0xBBAA if it is big endian. In other words, data objects, smaller than the size of the data portion of the external memory interface require positioning on the data bus that is offset from the most significant end of the bus if the mode is big endian and from the least significant end if the mode is little endian. These offsets are implemented in megacell 100 on a region basis corresponding to MMU pages by conditionally complementing byte enables based on the endianness mode included in an MMU page entry.

Figure 5:
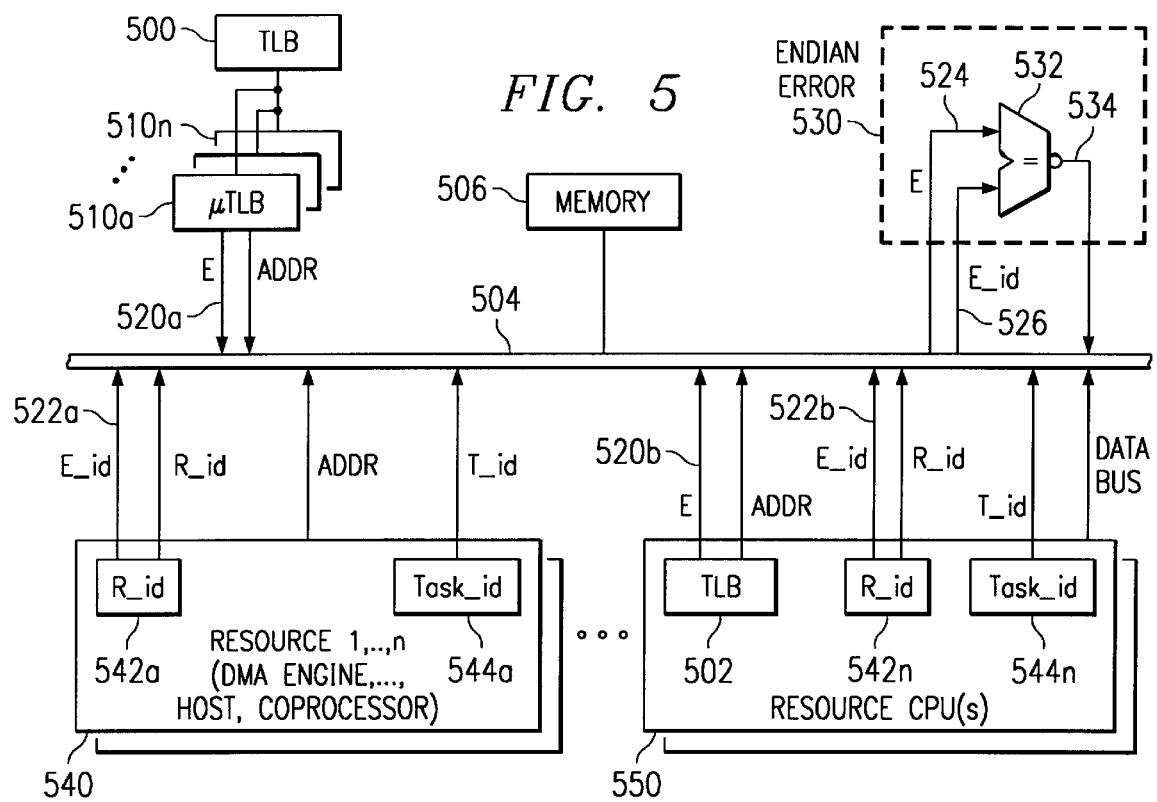
FIG. 5 is block diagram of a portion of a digital system as in FIG. 1 illustrating circuitry to detect a mismatch in endianness.

FIG. 5 is simplified block diagram of a portion of a digital system as in FIG. 1 illustrating circuitry to detect a mismatch in endianness. An access permission fault is generated when an MMU page entry endianness attribute bit does not match with the corresponding device endianness of an initiator resource that is requesting access to a page of memory represented by the page entry. Resources 540 are representative of DMA engine 106 and various coprocessors 108. Resources 550 are representative of various processors, such as processors 102 and 104. As described above, each resource has a resource ID register 542a–n. One bit in each resource ID register identifies the endianness of the associated resource.

As described above, an endianness attribute bit is provided in the MMU tables for each address space entry. Shared TLB 500 with associated μTLBs 510a–n service resources 540. Each resource 550 has an associated TLB 502 with associated μTLBs as described above.

In other embodiments of the present invention, other means besides the MMU table may be used to provide endianism attribute bits. For example, a separate endianism attribute table may be provided that is consulted by the MMU miss handler each time a TLB miss occurs.

During each memory transaction request, an endianism-ID signal such as E-ID 522a or 522b and a resource-ID is provided by a resource register along with a task-ID and address to traffic controller 504. Also, during each memory transaction request, the endianism attribute bit for a requested memory address page is provided by a TLB or μTLB associated with the requesting resource on signals 520a and 520b, for example.

Traffic controller 504 arbitrates competing requests and provides the highest priority request to memory sub-system 506 that is representative of the various memories within digital system 100. Traffic controller 504 also provides an address region endianism attribute signal 524 selected from signals 520a,b and endianism-ID signal 526 selected from signals 522a,b of the highest priority request. Endianness error circuitry 530 compares endianism attribute signal 524 with endianism-ID signal 526 and asserts error signal 534 if there is a mismatch between the endianism of a requesting resource and the endianism of the address range being accessed. A memory access transaction is aborted if endianism error signal 534 is asserted.

In the present embodiment, endianness error circuitry 530 is included with arbitration and control circuitry of traffic controller 504. In another embodiment, endianness error circuitry similar to 530 may be included within each resource module, for example. In this case, an endianness mismatch is detected prior to asserting a memory transaction request to controller 504.

Figure 6:
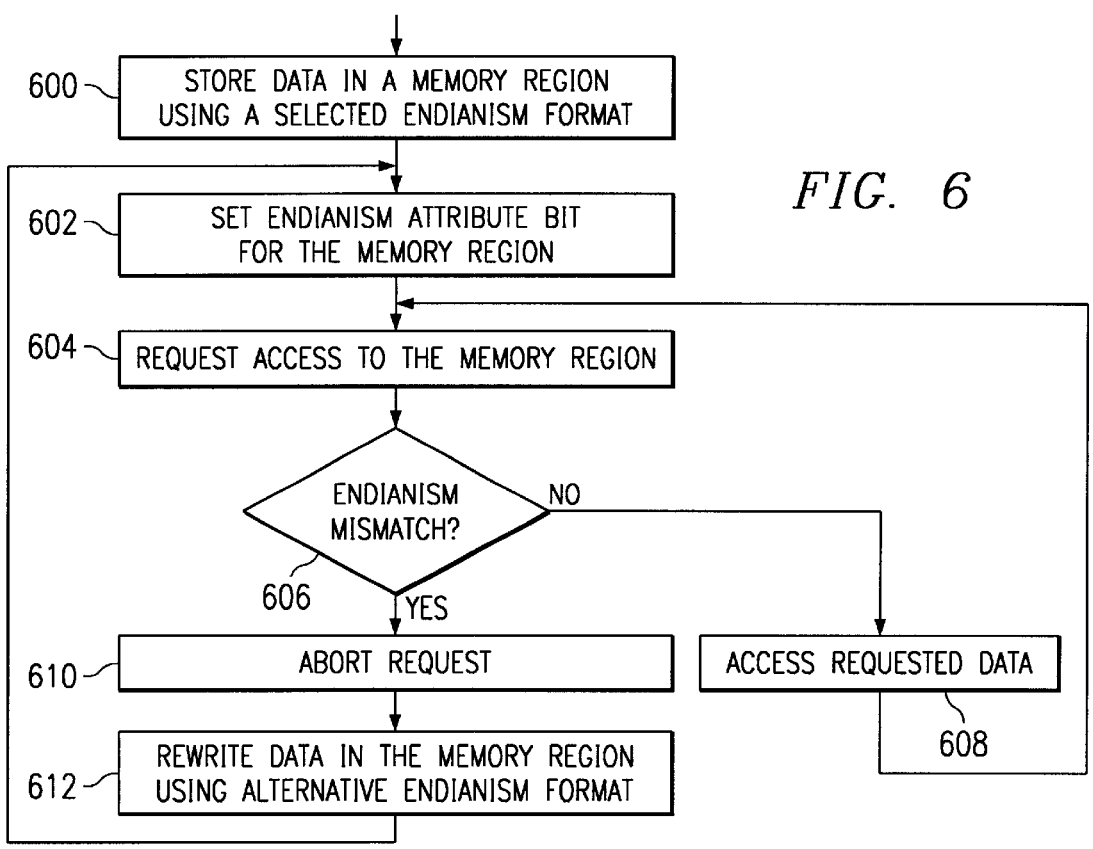
FIG. 6 is a flow chart illustrating operation of endianism mismatch checking circuitry of FIG. 5.

FIG. 6 is a flow chart illustrating operation of endianism mismatch checking circuitry of FIG. 5. Once an endianness mismatch error is detected, corrective action may be taken. In step 600, data is written to a memory region by a particular resource using a selected endianism format, which may be either big endian or little endian, for example. In step 602 the endianism attribute bit of the memory region is set according to the selected endianism format. Of course, if the region spans more than one MMU page, then multiple MMU page entries are set accordingly.

In step 604, a later access to the memory region is requested by either the same resource or by a different resource. In step 606, endianism match between the resource and the memory region is checked, as described above. If there is no mismatch, the request is allowed to complete in step 608.

If there is an endianism mismatch, then the request is aborted in step 610 and an abort handler is invoked. Based on the type of abort, the abort handler invokes a software routine that converts the data to an alternative endian format and rewrites the memory region in step 612. Returning then to step 602, the endianism attribute bit of the memory region is set according to the alternative endianism format and the access request is repeated in a now successful manner.

Figure 7:
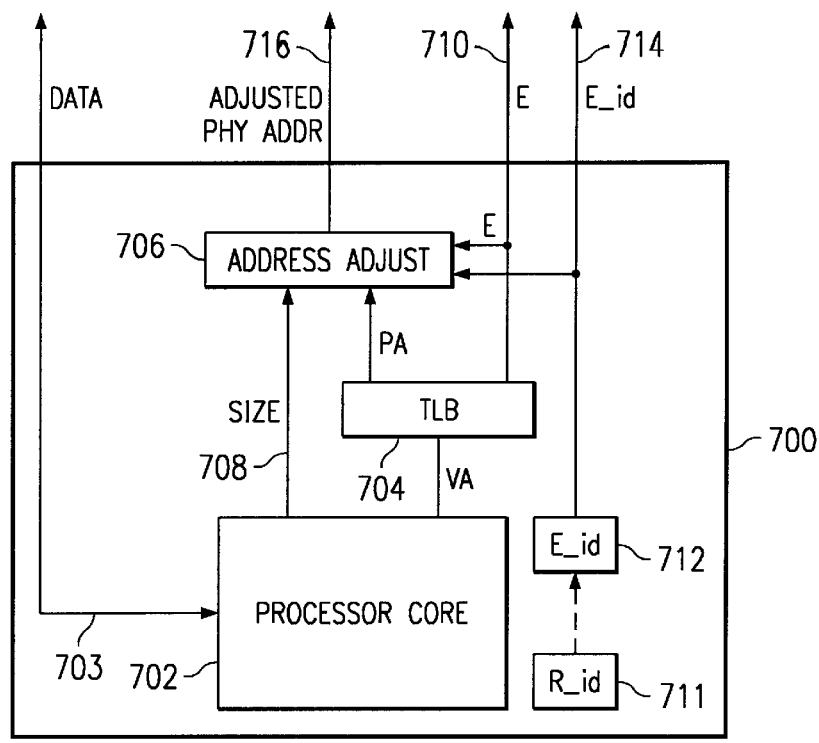
FIG. 7 is block diagram of a portion of a digital system similar to the digital system of FIG. 1, illustrating another embodiment of the present invention.

FIG. 7 is block diagram of a portion of a digital system similar to the digital system of FIG. 5, illustrating another embodiment of the present invention. Resource 700 is representative of one or more initiator resources 540 or 550. A processor core 702 provides a virtual address bus VA and has a data bus 703 for transferring data to a shared memory (not shown). As described above, a TLB or μTLB 704 converts virtual address to physical address PA. TLB 704 also provides an address region endianism attribute signal 710 as described above that is then provided externally to resource 700. Processor core 702 also provides size signals 708 to define the byte size of each memory transaction request.

In this embodiment, endianism-ID circuitry 712 is merely a hardwired point that indicates the natural endianness of resource 700 and is set to one state for a little endian resource and to another state for a big endian resource. Memory controller circuitry 706 is responsive to endianism attribute signal 710 and to size signals 708 to adjust the least significant address bits of the physical address according to an endianism format specified for each address space page. For example, if processor core is naturally a little endian processor, then for each transaction access request to a region of memory whose attribute is little endian the physical address is not adjusted. However, when a transaction access request is made to a region having a big endian attribute, then the physical address bits will be adjusted by inverting selected bits according to data size signals 708 in order to reverse the address ascension order to agree with the endianism of the selected memory region.

Address adjustment circuitry 706 is implemented using exclusive-OR gates, however one skilled in the art may select various types of circuitry to perform address bit flipping in response to resource endianism-ID signal 714 and address space endianism attribute signal 710.

In another embodiment of the present invention, endianism-ID circuitry 712 may be responsive to resource-ID register 711 such that endianism of an initiator resource is determined by examining the R-ID value. For example, a least significant bit (lsb) or a most significant bit (msb) of the R-ID value can be interpreted as the endianism-ID signal.

Alternatively, an endianism look-up table can be provided that responds to the R-ID provided with each memory transaction request to provide an endianism-ID that is associated with the proffered R-ID. In this case, the endianism look-up table can be dynamically configured by one or more processors in the system to allow for system reconfiguration. In another embodiment, the endianism look-up table can be hardwired or implemented in a semi-permanent manner, such as in a ROM, PROM or EAPROM, for example.

In another embodiment, some of the initiator resources have address adjustment circuitry such as circuitry 706 and other initiators do not have such circuitry. In this case, for the resources having adjustment circuitry the memory request address is adjusted to agree with the endianism attribute of the selected region. For resources that do not have adjustment circuitry, an access fault is generated by endianism error circuitry similar to circuitry 530 if the endianism of the initiating resource does not match the endianism attribute of the selected memory region. In this case, for those initiator resources that have adjustment circuitry, the endianism-ID signal that is provided to the endianism error circuitry is adjusted to match the endianism attribute bit so that an access protection fault is not generated for resources that provide address adjustment.

Digital System Embodiment

Figure 8:
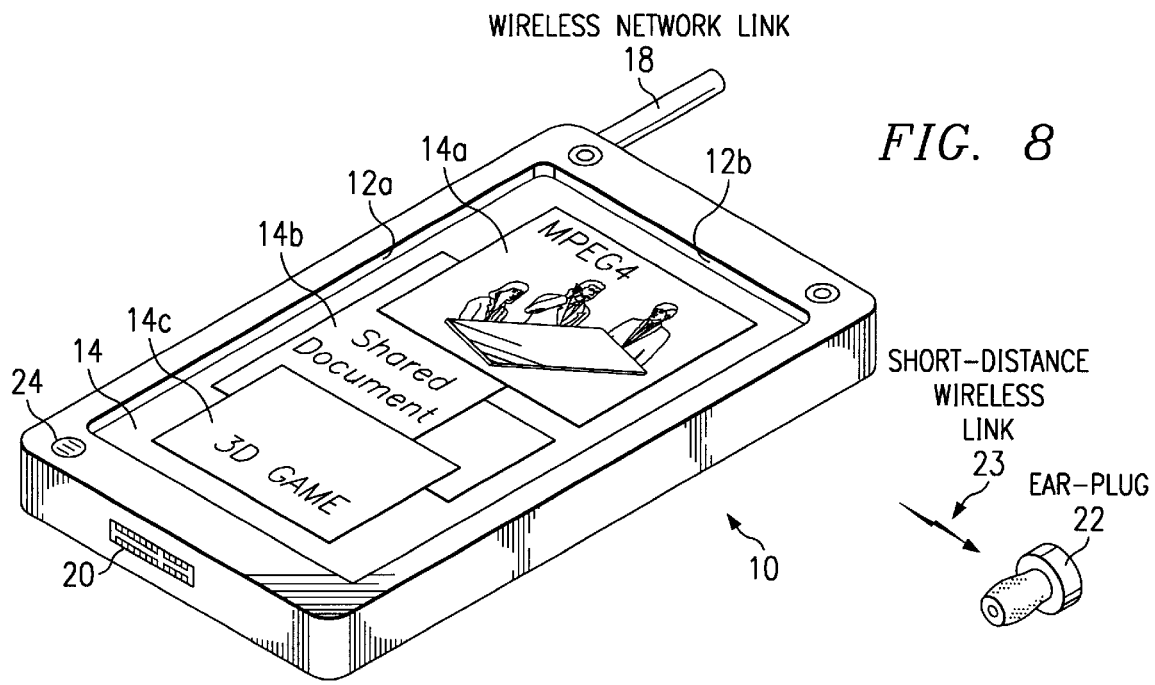
FIG. 8 is a representation of a telecommunications device incorporating an embodiment of the present invention.

FIG. 8 illustrates an exemplary implementation of an example of such an integrated circuit in a mobile telecommunications device, such as a mobile personal digital assistant (PDA) 10 with display 14 and integrated input sensors 12a, 12b located in the periphery of display 14. As shown in FIG. 8, digital system 10 includes a megacell 100 according to FIG. 1 that is connected to the input sensors 12a,b via an adapter (not shown), as an MPU private peripheral 142. A stylus or finger can be used to input information to the PDA via input sensors 12a,b. Display 14 is connected to megacell 100 via local frame buffer similar to frame buffer 136. Display 14 provides graphical and video output in overlapping windows, such as MPEG video window 14a, shared text document window 14b and three dimensional game window 14c, for example.

Radio frequency (RF) circuitry (not shown) is connected to an aerial 18 and is driven by megacell 100 as a DSP private peripheral 140 and provides a wireless network link. Connector 20 is connected to a cable adaptor-modem (not shown) and thence to megacell 100 as a DSP private peripheral 140 provides a wired network link for use during stationary usage in an office environment, for example. A short distance wireless link 23 is also "connected" to earpiece 22 and is driven by a low power transmitter (not shown) connected to megacell 100 as a DSP private peripheral 140. Microphone 24 is similarly connected to megacell 100 such that two-way audio information can be exchanged with other users on the wireless or wired network using microphone 24 and wireless ear piece 22.

Megacell 100 provides all encoding and decoding for audio and video/graphical information being sent and received via the wireless network link and/or the wire-based network link.

It is contemplated, of course, that many other types of communications systems and computer systems may also benefit from the present invention, particularly those relying on battery power. Examples of such other computer systems include portable computers, smart phones, web phones, and the like. As power dissipation and processing performance is also of concern in desktop and line-powered computer systems and micro-controller applications, particularly from a reliability standpoint, it is also contemplated that the present invention may also provide benefits to such line-powered systems.

Fabrication of the digital systems disclosed herein involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

The digital systems disclosed herein contain hardware extensions for advanced debugging features. These assist in the development of an application system. Since these capabilities are part of the megacell itself, they are available utilizing only a JTAG interface with extended operating mode extensions. They provide simple, inexpensive, and speed independent access to the core for sophisticated debugging and economical system development, without requiring the costly cabling and access to processor pins required by traditional emulator systems or intruding on system resources.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description.

It is therefore contemplated that the appended claims will cover any such modifications of the embodiments as fall within the true scope and spirit of the invention.

What is claimed is:

1. A digital system, comprising:

a memory for storing data;

a plurality of initiator resources connected to the memory, each of the plurality of initiator resources operable to initiate a memory request to the memory, the request including a physical address; and a memory management unit (MMU) connected to receive a memory request address provided by at least a first one of the plurality of initiator resources comprising:

a translation lookaside buffer having a plurality of entries, each entry corresponding to a selected region of the memory accessed by a memory request, each entry comprising a virtual address field, a physical address field, and an endianism attribute bit for the selected region of the memory, for forwarding, responsive to a memory request including a physical address matching an entry in the transaction lookaside buffer, a virtual address and the endianism attribute bit for that entry in.

2. The digital system of claim 1, wherein the MMU is operable to provide an endianism attribute bit for a selected region of the memory in response to each memory request address from the plurality of initiator resources.

3. The digital system according to claim 1, further comprising a memory controller connected to receive an endian identifier for the first initiator resource, the memory controller being connected to receive the endianism attribute bit and operable to provide an adjusted memory address to the memory responsive to a mismatch between the endianism attribute bit and the endian identifier.

4. The digital system according to claim 3, wherein the memory controller also receives transaction width information from the first initiator resource, the memory controller operable to provide an adjusted memory address portion to the memory in accordance with the endianism attribute bit, the endian identifier, and the transaction width information.

5. The digital system according to claim 1, further comprising endianism error circuitry connected to receive the endianism attribute bit and an endianism-ID signal from the first initiator resource, the endianism error circuitry operable to cause an access permission fault if the endianism attribute signal does not agree with the endianism-ID signal.

6. The digital system according to claim 5, it further comprising endianism-ID circuitry connected to receive a resource-ID value from the first initiator resource and to provide an endianism-ID signal in response to the resource-ID value.

7. The digital system according to claim 1 being a personal digital assistant, further comprising:

a display, connected to the first initiator resource via a display adapter;

radio frequency (RF) circuitry connected to one of the plurality of initiator resources; and an aerial connected to the RF circuitry.

8. A method of operating a digital system having a memory shared by a plurality of initiator resources, wherein a portion of the initiator resources are big endian and another portion of the initiator resources are little endian, comprising the steps of:

segregating the memory into a set of regions;

defining an endianism attribute for each memory region;

storing the endianism attribute of a selected memory region in a translation lookaside buffer in response to a memory transaction request to an address in that region by a requesting one of the plurality of initiator resources;

comparing an endianism of the requesting initiator resource with the stored endianism attribute for the selected memory region; and completing a memory transaction request to a first memory region in accordance with the result of the comparing step.

9. The method according to claim 8, wherein the step of completing comprises adjusting a memory request address to agree with the endianism attribute of the first memory region.

10. The method according to claim 8, wherein the step of completing comprises causing an access permission fault if the endianism of the requesting initiator resource does not agree with the endianism attribute of the selected memory region.

11. The method according to claim 8, further comprising the step of using a resource identification value provided by each of the plurality of initiator resources to identify the endianism of each of the plurality of initiator resources.

* * * * *